(12) United States Patent
Seno

(10) Patent No.: US 10,634,204 B2
(45) Date of Patent: Apr. 28, 2020

(54) DYNAMIC DAMPER

(71) Applicant: TOYO TIRE & RUBBER CO., LTD., Itami-shi, Hyogo (JP)

(72) Inventor: Yoshiyuki Seno, Itami (JP)

(73) Assignee: TOYO TIRE CORPORATION, Itami-shi (JP)

( * ) Notice: Subject to any disclaimer, the term of this patent is extended or adjusted under 35 U.S.C. 154(b) by 29 days.

(21) Appl. No.: 15/813,691

(22) Filed: Nov. 15, 2017

(65) Prior Publication Data

US 2018/0156291 A1 Jun. 7, 2018

(30) Foreign Application Priority Data

Dec. 7, 2016 (JP) .................................. 2016-237354

(51) Int. Cl.
| | |
|---|---|
| *F16F 15/04* | (2006.01) |
| *F16F 1/38* | (2006.01) |
| *F16F 1/373* | (2006.01) |
| *F16F 7/108* | (2006.01) |

(52) U.S. Cl.
CPC .............. *F16F 1/38* (2013.01); *F16F 1/3732* (2013.01); *F16F 7/108* (2013.01); *F16F 2226/04* (2013.01); *F16F 2230/24* (2013.01)

(58) Field of Classification Search
CPC .............................. F16F 7/108; F16F 2226/04
USPC ......................................................... 188/379
See application file for complete search history.

(56) References Cited

U.S. PATENT DOCUMENTS

| | | | | |
|---|---|---|---|---|
| 4,580,666 A | * | 4/1986 | Ferguson ................ | F16F 7/108 188/379 |
| 5,509,641 A | * | 4/1996 | Prinzler ................. | B60G 15/10 267/64.19 |
| 6,216,833 B1 | * | 4/2001 | Lefferts .................. | B60N 2/682 188/380 |
| 8,302,748 B2 | * | 11/2012 | Retat ..................... | F16F 15/046 188/379 |
| 2005/0133325 A1 | * | 6/2005 | Kuwayama .......... | F16F 1/3814 188/379 |
| 2011/0049776 A1 | * | 3/2011 | Gustavsson ............ | F16F 7/108 267/140.11 |

(Continued)

FOREIGN PATENT DOCUMENTS

| | | | | |
|---|---|---|---|---|
| DE | 20311199 U1 | 12/2003 | | |
| DE | 102011004459 A1 | * 8/2012 | ............. | F16F 7/108 |

(Continued)

OTHER PUBLICATIONS

Machine translation of DE 10 2011 004 459, retrieved Sep. 10, 2019 (Year: 2019).*

(Continued)

*Primary Examiner* — Bradley T King
(74) *Attorney, Agent, or Firm* — Westerman, Hattori, Daniels & Adrian, LLP

(57) ABSTRACT

A dynamic damper includes a tubular member, a mass body, a protruding section, an elastic coupling section, a fastening member, and a projecting section. The protruding section is positioned toward the second end of the tubular member with respect to the projecting section. The projecting section and the protruding section overlap in the axial direction of the tubular member at any position reached by relatively rotating the mass body around the axial center of the tubular member with respect to the tubular member.

14 Claims, 5 Drawing Sheets

(56) References Cited

U.S. PATENT DOCUMENTS

| 2016/0017949 | A1* | 1/2016 | Kobus | F16F 7/108 |
| | | | | 188/380 |
| 2018/0231091 | A1* | 8/2018 | Tamura | F16F 7/108 |

FOREIGN PATENT DOCUMENTS

| DE | 102017110598 A1 * | 11/2018 | F16F 7/108 |
| JP | 4-35255 Y | 8/1992 | |
| JP | 2010-91014 A | 4/2010 | |

OTHER PUBLICATIONS

Extended European Search Report dated May 4, 2018, issued in counterpart European Application No. 1720275.8. (7 pages).
Office Action dated Apr. 1, 2019, issued in counterpart CN Application No. 201711135776.4, with English translation. (10 pages).
Office Action dated Dec. 2, 2019, issued in counterpart CN Application No. 201711135776.4, with English translation (12 pages).

\* cited by examiner

DYNAMIC DAMPER

TECHNICAL FIELD

The present invention relates to a dynamic damper capable of preventing a mass body from falling off.

BACKGROUND ART

When, for example, an automobile or other vehicle or an industrial machine is used, vibrations of an engine or other parts, resonance caused during traveling or operation, and many other harmful vibrations may occur. Therefore, a dynamic damper may be adopted to inhibit such harmful vibrations. The dynamic damper may be configured so that a tubular member, which is attached to a target member to be inhibited from vibrating, and a tubular mass body, which coaxially surrounds the tubular member, are coupled by an elastic coupling section formed of a rubber elastic body (Patent Literature 1). According to Patent Literature 1, the mass body is prevented from falling off due, for instance, to fracture of the elastic coupling section by setting the outside diameter of the head of a bolt for fastening the tubular member to the target member to be larger than the inside diameter of the mass body.

CITATION LIST

Patent Literature

[Patent Literature 1] Japanese Utility Model Publication No. Hei 4 (1992)-35255

SUMMARY OF INVENTION

Technical Problem

However, when the above-described conventional technology is used to adjust a spring constant that is a parameter for determining the natural frequency of the dynamic damper, the axis-perpendicular dimension of the elastic coupling section needs to be adjusted by adjusting the inside diameter of the mass body and the outside diameter of the tubular member. As mentioned above, the natural frequency of the dynamic damper is not easily adjustable.

The present invention has been made to address the above problem. An object of the present invention is to provide a dynamic damper that is capable of facilitating the adjustment of the natural frequency and preventing the mass body from falling off.

Solution to Problem

In order to accomplish the above object, a dynamic damper according to the present invention includes a tubular member, a mass body, a protruding section, an elastic coupling section, a fastening member, and a projecting section. The tubular member has a first end and a second end, which are both axial ends. The mass body is tubular in shape and has an inner peripheral surface that is disposed at a predetermined distance from an outer peripheral surface of the tubular member. The protruding section protrudes from the inner peripheral surface of the mass body, has a leading end opposing the outer peripheral surface of the tubular member, and is molded integrally with the mass body. The elastic coupling section is formed of a rubber elastic body that couples the inner peripheral surface of the mass body and the protruding section to the outer peripheral surface of the tubular member. The fastening member is inserted into the tubular member in order to fasten the second end of the tubular member to a target member. The projecting section is disposed at the first end and projects outward in an axis-perpendicular direction of the tubular member. The protruding section is positioned toward the second end with respect to the projecting section. The projecting section and the protruding section overlap in the axial direction of the tubular member at any position reached by relatively rotating the mass body around the axial center of the tubular member with respect to the tubular member.

Advantageous Effects of Invention

According to the dynamic damper described in a first aspect of the present invention, the protruding section protrudes from the inner peripheral surface of the mass body at a position toward the second end with respect to the projecting section projecting outward in the axis-perpendicular direction at the first end of the tubular member. Further, the projecting section and the protruding section overlap in the axial direction of the tubular member at any position reached by relatively rotating the mass body around the axial center of the tubular member with respect to the tubular member. This makes it possible to prevent the mass body from falling off from the tubular member due, for instance, to fracture of the elastic coupling section.

Furthermore, a spring constant of the elastic coupling section that is a parameter for determining the natural frequency of the dynamic damper is largely dependent on the axis-perpendicular dimension between the leading end of the protruding section and the outer peripheral surface of the tubular member. Therefore, the spring constant of the elastic coupling section can be adjusted more easily by adjusting the amount of protrusion of the protruding section from the mass body than by adjusting the outside diameter of the tubular member and the inside diameter of the mass body. This facilitates the adjustment of the natural frequency of the dynamic damper and prevents the mass body from falling off.

According to the dynamic damper described in a second aspect of the present invention, the protruding section has a sloped surface that approaches the outer peripheral surface of the tubular member when sloped toward the leading end of the protruding section from an axial outside. The sloped surface contiguous to the inner peripheral surface of the mass body increases the angle of a corner between the inner peripheral surface of the mass body and the protruding section. This inhibits an adhesive for vulcanization-bonding the mass body to the protruding section from accumulating in the corner. Consequently, in addition to the advantageous effects of the first aspect, the second aspect inhibits a bonding failure between the mass body, the protruding section, and the elastic coupling section from being caused by the accumulation of the adhesive.

According to the dynamic damper described in a third aspect of the present invention, a cutting mark is formed on the leading end of the protruding section molded integrally with the mass body, which is a casting. The leading end of the protruding section can be smoothed by cutting the leading end of the cast protruding section. Therefore, the axis-perpendicular dimension between the leading end of the protruding section and the tubular member can easily be adjusted to a desired value. The axis-perpendicular dimension between the leading end of the protruding section and the tubular member is largely dependent on the spring constant of the elastic coupling section. Consequently, when the axis-perpendicular dimension can easily be adjusted to a desire value, in addition to the advantageous effects of the first aspect, the third aspect makes it easy to suppress variations in the natural frequency of the dynamic damper.

According to the dynamic damper described in a fourth aspect of the present invention, the protruding section is formed contiguously in the circumferential direction of the mass body. The spring constant of the elastic coupling section, which is dependent on the axis-perpendicular dimension between the leading end of the protruding section and the tubular member, can then be made substantially uniform in the circumferential direction. Consequently, in addition to the advantageous effects of the first aspect, the fourth aspect ensures that the natural frequency of the dynamic damper is substantially uniform in the circumferential direction.

According to the dynamic damper described in a fifth aspect of the present invention, the projecting section is formed on a circumferential part of the tubular member. Further, the protruding section is formed contiguously in the circumferential direction of the mass body. This makes it possible to reduce the weight of the projecting section and properly orient both the projecting section and the protruding section in the axial direction. Consequently, in addition to the advantageous effects of the fourth aspect, the fifth aspect reduces the weight of the projecting section and prevents the mass body from falling off from the tubular member due, for instance, to fracture of the elastic coupling section.

According to the dynamic damper described in a sixth aspect of the present invention, the protruding section is formed on a circumferential part of the mass body. Consequently, in addition to the advantageous effects of the first aspect, the sixth aspect reduces the weight of the protruding section.

According to the dynamic damper described in a seventh aspect of the present invention, the protruding section protrudes from the axial center of the mass body. Therefore, the spring constant at the axial center of the elastic coupling section, which is between the protruding section and the tubular member, can be made greater than the spring constant at the axial outside of the elastic coupling section. Consequently, in addition to the advantageous effects of the first aspect, the seventh aspect ensures that the mass body is likely to vibrate in a prying direction with respect to the tubular member.

According to the dynamic damper described in an eighth aspect of the present invention, the protruding section protrudes from both axial ends of the mass body. Therefore, the spring constant at both axial ends of the elastic coupling section, which is between the protruding section and the tubular member, can be made greater than the spring constant therebetween. Consequently, in addition to the advantageous effects of the first aspect, the eighth aspect ensures that the mass body is unlikely to vibrate in the prying direction with respect to the tubular member.

According to the dynamic damper described in a ninth aspect of the present invention, the leading end of the protruding section and the outer peripheral surface of the tubular member are formed in parallel with the axial center. Therefore, the spring constant of the elastic coupling section between the leading end of the protruding section and the outer peripheral surface of the tubular member can be made substantially uniform in the axial direction. Consequently, in addition to the advantageous effects of the first aspect, the ninth aspect makes it easy to suppress variations in the natural frequency of the dynamic damper.

DESCRIPTION OF EMBODIMENTS

Figure 1:
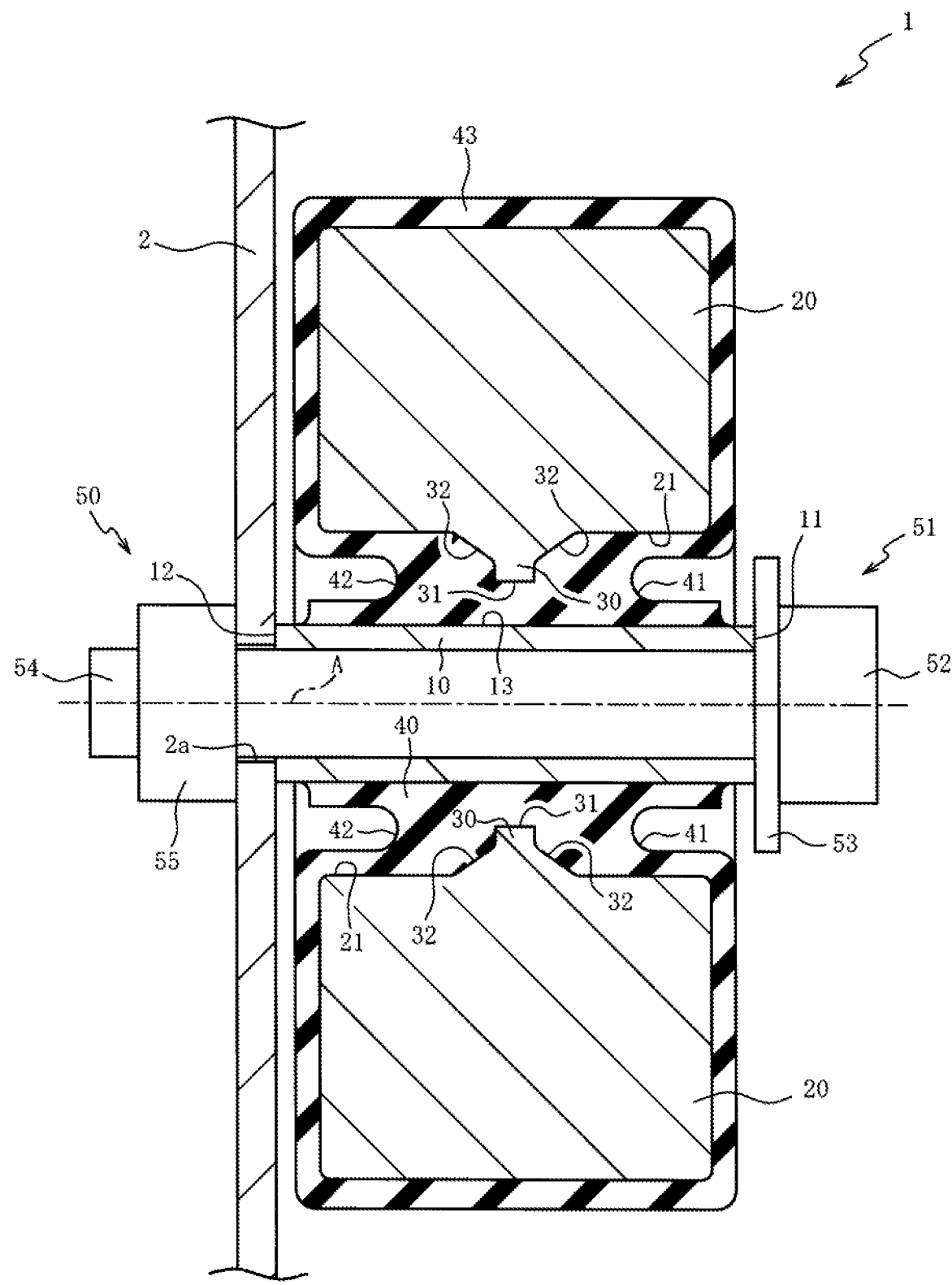
FIG. 1 is a cross-sectional view illustrating a dynamic damper according to a first embodiment of the present invention.

Preferred embodiments of the present invention will now be described with reference to the accompanying drawings. First of all, a dynamic damper 1 according to a first embodiment of the present invention will be described with reference to FIG. 1. FIG. 1 is a cross-sectional view illustrating the dynamic damper 1 according to the first embodiment of the present invention.

As illustrated in FIG. 1, the dynamic damper 1 is a device that inhibits harmful vibrations such as vibrations of an engine or other parts of automobiles or other vehicles or industrial machines and resonance caused during traveling or operation. The dynamic damper 1 is attached to a target member 2 that vibrates. The target member 2 is, for example, a bracket for an engine mount and is a plate-like member.

The dynamic damper 1 includes a tubular member 10, a mass body 20, a protruding section 30, an elastic coupling section 40, and a fastening member 50. The mass body 20 is tubular in shape and has an inner peripheral surface 21 that is disposed at a predetermined distance from an outer peripheral surface 13 of the tubular member 10. The protruding section 30 protrudes from the inner peripheral surface 21 of the mass body 20. The elastic coupling section 40 couples the mass body 20 and the protruding section 30 to the tubular member 10. The fastening member 50 fastens the tubular member 10 to the target member 2.

The tubular member 10 is a cylindrical metal member that is centered around its axial center A. The tubular member 10 includes a first end 11 and a second end 12, which are both axial ends. The mass body 20 is a thick, cylindrical metal member that coaxially surrounds the tubular member 10. The axial center of the mass body 20 coincides with the axial center A of the tubular member 10.

The protruding section 30 is molded integrally with the mass body 20. The protruding section 30 protrudes from the axial center of the inner peripheral surface 21 of the mass body 20 toward the outer peripheral surface 13 of the tubular member 10. The protruding section 30 is annular in shape and formed continuously in the circumferential direction. The inner peripheral surface of the protruding section 30 includes a leading end surface 31 and a sloped surface 32.

The leading end surface 31 forms a leading end of the protruding section 30 that is the farthest from the mass body 20. The leading end surface 31 opposes the outer peripheral surface 13 of the tubular member 10. The leading end surface 31 is formed in parallel with the axial center A (the outer peripheral surface 13 of the tubular member 10) in a cross-section including the axial center A. The sloped surface 32 is contiguous to the inner peripheral surface 21 of the mass body 20. The sloped surface 32 approaches the outer peripheral surface 13 of the tubular member 10 when sloped toward the leading end surface 31 from an axial outside.

The elastic coupling section 40 is formed of a rubber elastic body. The elastic coupling section 40 is disposed between the inner peripheral surface 21 of the mass body 20 and the outer peripheral surface 13 of the tubular member 10. The elastic coupling section 40 is vulcanization-bonded to the inner peripheral surface 21 of the mass body 20, the protruding section 30, and the outer peripheral surface 13 of the tubular member 10.

Concaved portions 41, 42 are formed in the elastic coupling section 40 and concaved from axial ends toward the protruding section 30. The spring constant of the elastic coupling section 40 can be adjusted by adjusting the depth (axial dimension) of the concaved portions 41, 42.

The outer peripheral surface and both axial ends of the mass body 20 are covered with an elastic film 43 that is molded integrally with the elastic coupling section 40. Covering the mass body 20 with the elastic film 43 reduces an impact sound that is generated when the mass body 20 vibrates to collide, for example, with the target member 2.

The axial dimension of the mass body 20 covered with the elastic film 43 is set to be smaller than the axial dimension of the tubular member 10. This reduces the contact between the elastic film 43, the target member 2, and the fastening member 50 when, for example, the mass body 20 vibrates in an axis-perpendicular direction with respect to the tubular member 10 attached to the target member 2. This inhibits the vibration of the mass body 20 from being obstructed by the above-mentioned contact.

The fastening member 50 includes a flange bolt 51 and a nut 55. The flange bolt 51 includes a head 52, a flange 53, and an axis portion 54. The head 52 is shaped like a hexagon when viewed in the axial direction. The flange 53 is shaped like a disk and disposed at one axial end of the head 52. The axis portion 54 axially protrudes from the flange 53, which is sandwiched between the head 52 and the axis portion 54. The flange 53 projects outward in the axis-perpendicular direction by a predetermined amount from the head 52. At the first end 11 of the tubular member 10, the flange 53 projects more outward in the axis-perpendicular direction than the outer peripheral surface 13 of the tubular member 10.

When the tubular member 10 is to be attached to the target member 2, the axis portion 54 is first inserted into the tubular member 10 from the first end 11 of the tubular member 10. The axis portion 54 protruded from the second end 12 is then inserted into a through-hole 2a that penetrates through the target member 2 in the direction of plate thickness. Subsequently, when a nut 55 is attached to the axis portion 54, which is inserted into the through-hole 2a in the target member 2, the tubular member 10 is axially sandwiched between the target member 2 and the flange 53. The fastening member 50 then fastens the tubular member 10 to the target member 2.

Figure 2A:
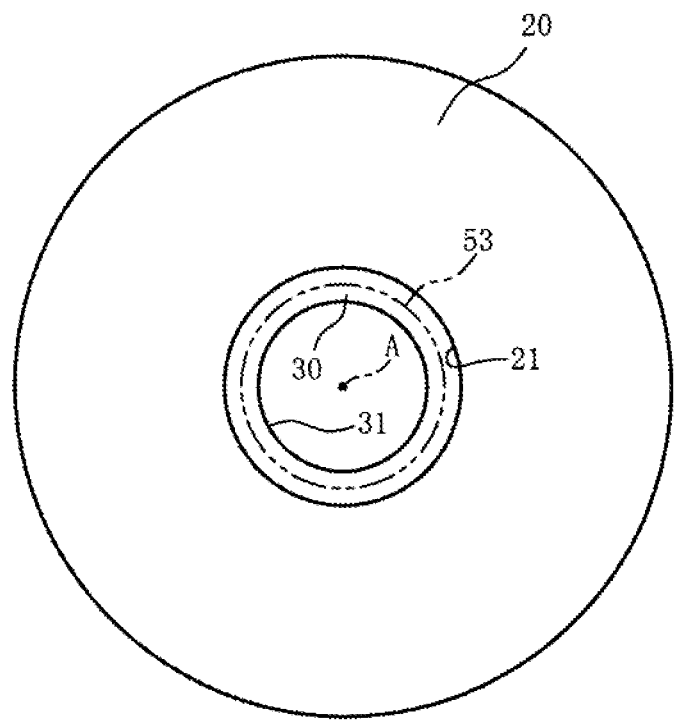
FIG. 2A is a side view illustrating a mass body and a protruding section.

The relationship between the protruding section 30 and the flange 53 will now be described with reference to FIG. 2A as well as to FIG. 1. FIG. 2A is a side view illustrating the mass body 20 and the protruding section 30. In FIG. 2A, the outline of the flange 53 is indicated by a two-dot chain line.

As indicated in FIGS. 1 and 2A, the outside diameter of the flange 53 is set to be larger than the inside diameter of the protruding section 30. Therefore, a part of the flange 53 and a part of the protruding section 30 axially overlap along the entire circumference. Further, the protruding section 30 is positioned toward the second end 12 with respect to the flange 53. This prevents the mass body 20 from falling off from the tubular member 10 due, for instance, to fracture of the elastic coupling section 40.

In order to prevent the mass body 20 from falling off due, for instance, to fracture of the elastic coupling section 40 in a situation where the protruding section 30 is not protruded from the inner peripheral surface 21 of the mass body 20, the outside diameter of the flange 53 for the flange bolt 51 needs to be larger than the inside diameter of the mass body 20. However, the axis-perpendicular dimension (elastic coupling section 40) between the outer peripheral surface 13 of the tubular member 10 and the inner peripheral surface 21 of the mass body 20 is determined in order to obtain a desired natural frequency of the dynamic damper 1. When a flange bolt 51 compliant, for example, with a JIS standard is used, the outside diameter of the flange 53 may be smaller than the inside diameter of the mass body 20 depending on the axis-perpendicular dimension. In such an instance, it is necessary to use a custom-made, nonstandard flange bolt 51.

Meanwhile, in the first embodiment, the protruding section 30 can be axially overlapped with the flange 53 for the flange bolt 51 compliant, for example, with the JIS standard by adjusting the amount of protrusion of the protruding section 30, which protrudes from the inner peripheral surface 21 of the mass body 20. Thus, the flange bolt 51 compliant, for example, with the JIS standard can be used. This reduces the cost of the flange bolt 51 as compared to the use of a nonstandard flange bolt 51.

Further, the protruding section 30 protrudes from the inner peripheral surface 21 of the mass body 20, and the protruding section 30 and the flange 53 axially overlap to prevent the mass body 20 from falling off. Therefore, the inside diameter of the mass body 20 can be set irrespective of the outside diameter of the flange 53. This increases the degree of freedom in designing the inside diameter of the mass body 20, and thus increases the degree of freedom in designing the axis-perpendicular dimension between the inner peripheral surface 21 of the mass body 20 and the outer peripheral surface 13 of the tubular member 10. This makes it easy to adjust the natural frequency of the dynamic damper 1, which is dependent on the axis-perpendicular dimension.

Figure 3A:
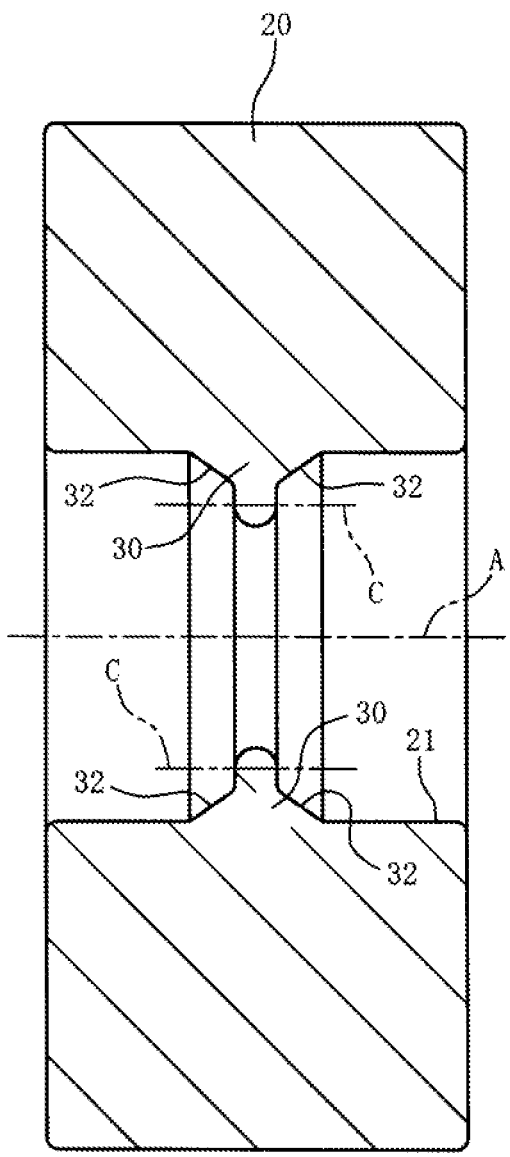
FIG. 3A is a cross-sectional view illustrating the mass body and the protruding section before cutting.
Figure 3B:
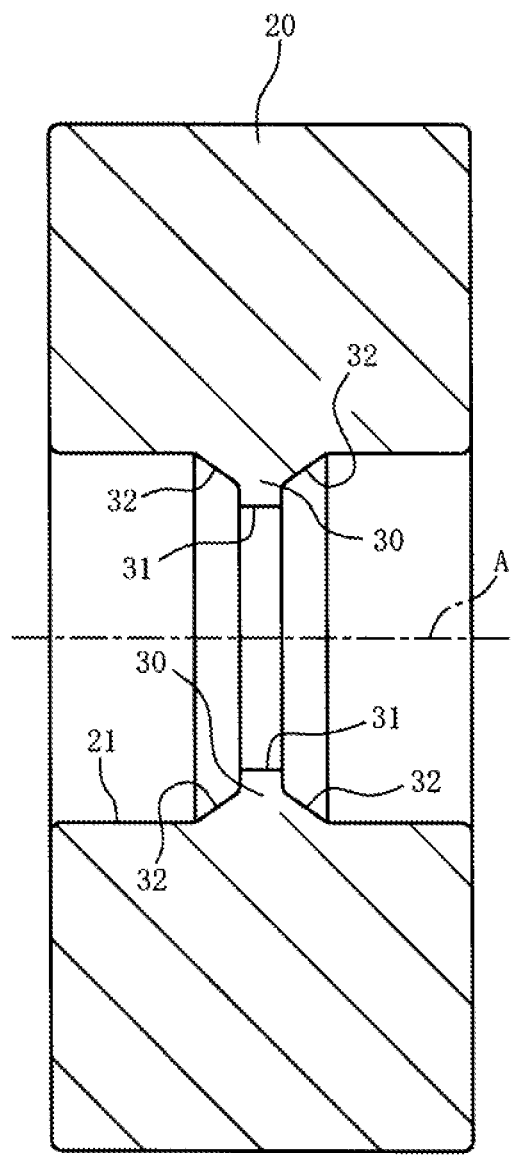
FIG. 3B is a cross-sectional view illustrating the mass body and the protruding section after cutting.

A method of manufacturing the mass body 20 and the protruding section 30 will now be described with reference to FIGS. 3A and 3B. FIG. 3A is a cross-sectional view illustrating the mass body 20 and the protruding section 30 before cutting. FIG. 3B is a cross-sectional view illustrating the mass body 20 and the protruding section 30 after cutting.

When the mass body 20 and the protruding section 30 are to be manufactured, the mass body 20 and the protruding section 30 shown in FIG. 3A are cast at first. Next, the leading end of the protruding section 30 that is the farthest from the mass body 20 is cut along a cutting virtual line C that is in parallel with the axial center A. As a result, the leading end surface 31 of the protruding section 30 is formed as shown in FIG. 3B. That is why a cutting mark is formed on the leading end surface 31.

Referring again to FIG. 1, a method of manufacturing the dynamic damper 1 will now be described. First of all, an adhesive for vulcanization-bonding is applied to the outer peripheral surface 13 of the tubular member 10 and to the surfaces of the mass body 20 and the protruding section 30. Next, the tubular member 10, the mass body 20, and the protruding section 30, which are coated with the adhesive, are placed in predetermined positions in a mold (not shown). Unvulcanized rubber, which is a raw material for the elastic coupling section 40 and the elastic film 43, is filled into a cavity in the mold. Subsequently, when the unvulcanized rubber is vulcanized and the resulting vulcanized molding is removed from the mold, the elastic coupling section 40 is vulcanization-molded, and the outer peripheral surface 13 of the tubular member 10, the inner peripheral surface 21 of the mass body 20, and the protruding section 30 are vulcanization-bonded to the elastic coupling section 40. As a result, the dynamic damper 1 is manufactured.

As described above, the dynamic damper 1 according to the first embodiment suppresses vibrations of the target member 2 attached to the dynamic damper 1 that correspond to the natural frequency of the dynamic damper 1. The natural frequency of the dynamic damper 1 is determined by the mass of the mass body 20 and the spring constant of the elastic coupling section 40. If, in this instance, the protruding section 30 is not protruded from the inner peripheral surface 21 of the mass body 20, the axis-perpendicular dimension of the elastic coupling section 40 is determined based on the axis-perpendicular dimension between the inner peripheral surface 21 of the mass body 20 and the outer peripheral surface 13 of the tubular member 10. The spring constant of the elastic coupling section 40 is then determined by the axis-perpendicular dimension of the elastic coupling section 40. Thus, in order to adjust the spring constant of the elastic coupling section 40, it is necessary to adjust the inside diameter of the mass body 20 and the outside diameter of the tubular member 10. This makes it difficult to adjust the natural frequency of the dynamic damper 1.

Meanwhile, in the first embodiment, the protruding section 30 protrudes from the inner peripheral surface 21 of the mass body 20. Therefore, the spring constant of the elastic coupling section 40 is largely dependent on the axis-perpendicular dimension between the leading end surface 31 of the protruding section 30 and the outer peripheral surface 13 of the tubular member 10. The spring constant of the elastic coupling section 40 is more easily adjustable by adjusting the amount of protrusion of the protruding section 30 from the inner peripheral surface 21 of the mass body 20 to the leading end surface 31 of the protruding section 30 than by adjusting the inside diameter of the mass body 20 and the outside diameter of the tubular member 10. Consequently, the protruding section 30, which axially overlaps with the flange 53 in order to prevent the fall-off of the mass body 20, makes it easy to adjust the natural frequency of the dynamic damper 1.

Further, the leading end surface 31 is formed by cutting the leading end of the cast protruding section 30. Therefore, the amount of protrusion of the protruding section 30 can be made easily adjustable by adjusting the position of the cutting virtual line C. Furthermore, the mass body 20 and the protruding section 30, which are castings, have considerably rough surfaces. Therefore, significant variations occur in the axis-perpendicular dimension between the outer peripheral surface 13 of the tubular member 10, the inner peripheral surface 21 of the mass body 20, and the protruding section 30.

However, the leading end surface 31 can be smoothed by cutting. Therefore, the axis-perpendicular dimension between the leading end surface 31 and the outer peripheral surface 13 of the tubular member 10 can easily be adjusted to a desired value. The spring constant of the elastic coupling section 40 is largely dependent on the axis-perpendicular dimension between the leading end surface 31 of the protruding section 30 and the outer peripheral surface 13 of the tubular member 10. Consequently, variations in the natural frequency of the dynamic damper 1 can easily be suppressed by making the axis-perpendicular dimension easily adjustable to a desired value.

In the first embodiment, in particular, the leading end surface 31 is formed by cutting in such a manner that it is parallel to the outer peripheral surface 13 of the tubular member 10. Therefore, the axis-perpendicular dimension between the leading end surface 31 and the outer peripheral surface 13 of the tubular member 10 can be made substantially uniform in the axial direction. When the axis-perpendicular dimension is made substantially uniform in the axial direction, it is easy to suppress the variations in the natural frequency of the dynamic damper 1.

Further, if, as mentioned earlier, the protruding section 30 does not exist, the spring constant of the elastic coupling section 40 is determined by the axis-perpendicular dimension between the inner peripheral surface 21 and the outer peripheral surface 13. Thus, in order to suppress the variations in the natural frequency of the dynamic damper 1 (variations in the spring constant of the elastic coupling section 40), it is necessary to cut and smooth out the entire inner peripheral surface 21 of the mass body 20, which is a casting.

Meanwhile, in the first embodiment, the spring constant of the elastic coupling section 40 is largely dependent on the axis-perpendicular dimension between the leading end surface 31 and the outer peripheral surface 13. Therefore, the variations in the natural frequency of the dynamic damper 1 can be sufficiently suppressed by cutting and smoothing out only the leading end surface 31 and without cutting the inner peripheral surface 21 of the mass body 20. Consequently, when the protruding section 30 exists, it is possible to reduce the amount of cutting for suppressing the variations in the natural frequency of the dynamic damper 1.

In a cross-section of the dynamic damper 1 that includes the axial center A, the angle of a corner between the inner peripheral surface 21 of the mass body 20 and the protruding section 30 can be increased by the sloped surface 32 contiguous to the inner peripheral surface 21 of the mass body 20. When the angle of the corner between the inner peripheral surface 21 and the protruding section 30 approaches 90 degrees, the adhesive for vulcanization-bonding the mass body 20 and the protruding section 30 to the elastic coupling section 40 is more likely to accumulate in the corner between the inner peripheral surface 21 and the protruding section 30 due to surface tension. Because of such accumulation of the adhesive, a bonding failure is likely to occur between the mass body 20, the protruding section 30, and the elastic coupling section 40.

Meanwhile, in the first embodiment, the sloped surface 32 increases the angle of the corner between the inner peripheral surface 21 and the protruding section 30. Therefore, the adhesive for vulcanization bonding is unlikely to accumulate in the corner. This inhibits a bonding failure between the mass body 20, the protruding section 30, and the elastic coupling section 40 from being caused by the accumulation of the adhesive.

The protruding section 30 protrudes from the axial center of the inner peripheral surface 21 of the mass body 20. Therefore, the spring constant of the elastic coupling section 40 at the axial center, which is between the protruding section 30 and the tubular member 10, is greater than the spring constant at the axial outside. Consequently, the mass body 20 is likely to vibrate in the prying direction with respect to the tubular member 10.

Figure 2B:
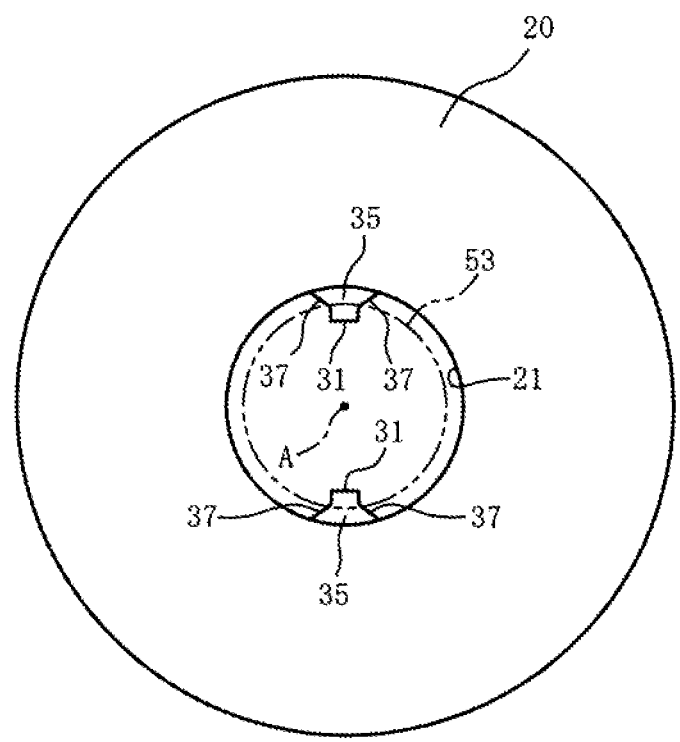
FIG. 2B is a side view of the mass body and protruding section illustrating a modification of the protruding section.

As illustrated in FIG. 2A, the protruding section 30 is continuous in the circumferential direction. Therefore, the spring constant of the elastic coupling section 40 (see FIG. 1) can be made substantially uniform in the circumferential direction. Thus, the natural frequency of the dynamic damper 1 can be made substantially uniform in the circumferential direction. The protruding section 30 need not always be formed continuously in the circumferential direction. As illustrated in FIG. 2B, protruding sections 35 may alternatively be formed circumferentially on a part of the inner peripheral surface 21 of the mass body 20. The two protruding sections 35 are disposed symmetrically with respect to the axial center A. The spring constant of the elastic coupling section 40 (see FIG. 1) at a circumferential portion having a protruding section 35 is different from the spring constant of the elastic coupling section 40 at a circumferential portion having no protruding section 35. Consequently, the natural frequency of the dynamic damper 1 in a certain vibration direction can be made different from the natural frequency of the dynamic damper 1 in a different vibration direction.

The external form of the flange 53 is circular when viewed in the axial direction, and the distance between the two protruding sections 35 is set to be smaller than the outside diameter of the flange 53. Therefore, the flange 53 axially overlaps with the protruding sections 35 at any position reached by relatively rotating the mass body 20 around the axial center A with respect to the flange 53 and the tubular member 10. This makes it possible to reduce the weight of the protruding sections 35 and prevent the mass body 20 from falling off from the tubular member 10 due, for instance, to fracture of the elastic coupling section 40.

The protruding sections 35 each include laterally sloped surfaces 37. The laterally sloped surfaces 37 are sloped to approach the axial center A when a circumferential side surface approaches the leading end surface 31. The laterally sloped surfaces 37 are contiguous to the inner peripheral surface 21 of the mass body 20. Therefore, as is the case with the sloped surface 32, which increases the angle of the corner between the inner peripheral surface 21 of the mass body 20 and the protruding sections 35, the laterally sloped surfaces 37 increase the circumferential angle of the corner between the inner peripheral surface 21 and the protruding sections 35. The laterally sloped surfaces 37 ensure that the adhesive is unlikely to circumferentially accumulate in the corner between the inner peripheral surface 21 and the protruding sections 35. This inhibits a bonding failure between the mass body 20, the protruding sections 35, and the elastic coupling section 40 from being caused by the accumulation of the adhesive.

A second embodiment of the present invention will now be described with reference to FIGS. 4 and 5A. The first embodiment has been described on the assumption that the protruding section 30 protrudes from the axial center of the inner peripheral surface 21 of the mass body 20. However, the second embodiment will be described on the assumption that a protruding section 65 protrudes from both axial ends of the inner peripheral surface 21 of the mass body 20. Elements identical with those described in conjunction with the first embodiment are designated by the same reference signs as their counterparts and will not be redundantly described.

Figure 4:
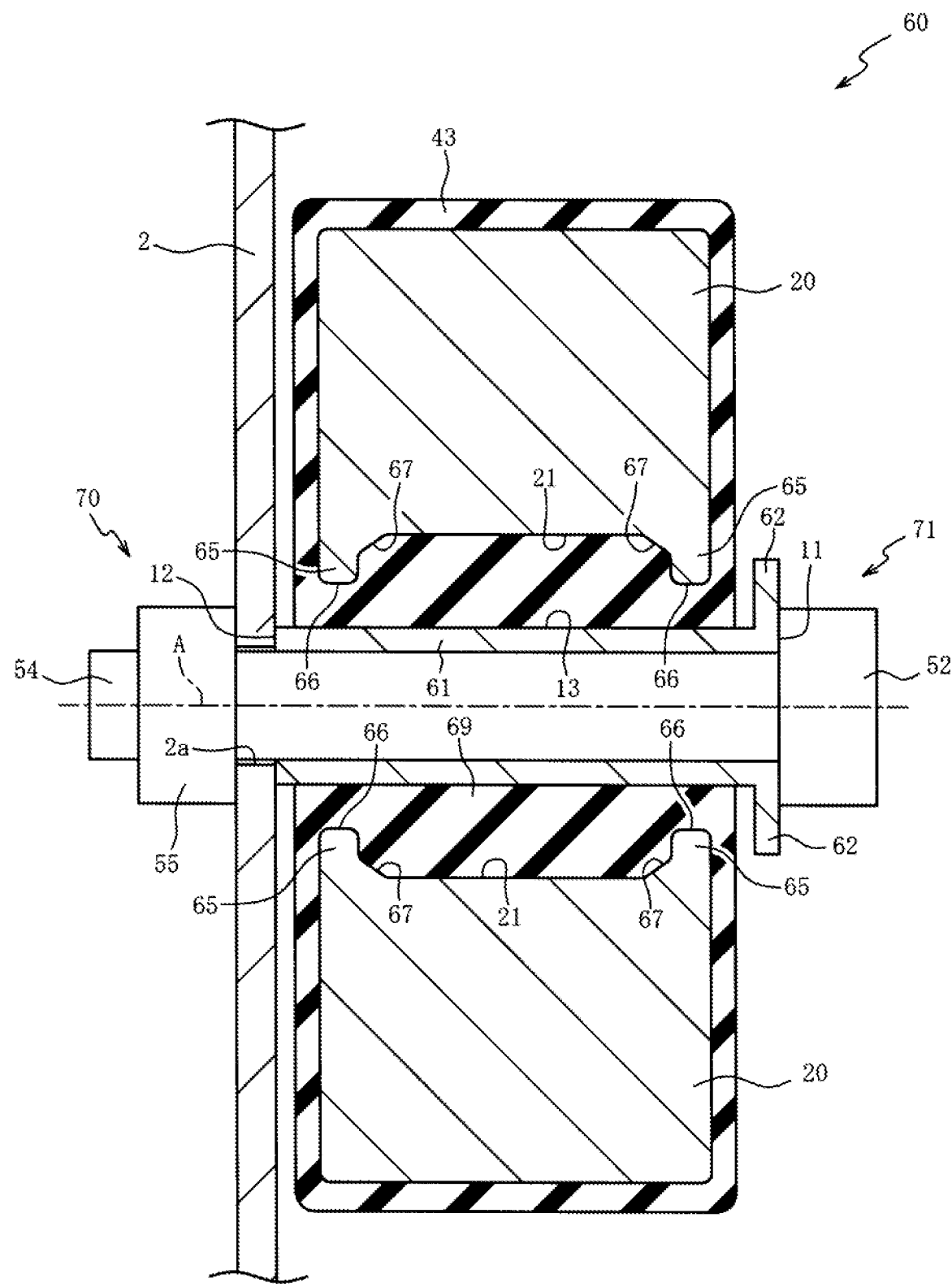
FIG. 4 is a cross-sectional view illustrating the dynamic damper according to a second embodiment of the present invention.

FIG. 4 is a cross-sectional view illustrating a dynamic damper 60 according to the second embodiment. FIG. 5A is a side view illustrating the mass body 20 and the protruding section 65. In FIG. 5A, the outline of a projecting section 62 and the outline of the outer peripheral surface 13 of a tubular member 61 are indicated by a two-dot chain line.

As illustrated in FIG. 4, the dynamic damper 60 includes the tubular member 61, the mass body 20, the protruding section 65, an elastic coupling section 69, and a fastening member 70. The mass body 20 is tubular in shape and has an inner peripheral surface 21 that is disposed at a predetermined distance from the outer peripheral surface 13 of the tubular member 61. The protruding section 65 protrudes from the inner peripheral surface 21 of the mass body 20. The elastic coupling section 69 couples the mass body 20 and the protruding section 65 to the tubular member 61. The fastening member 70 fastens the tubular member 61 to the target member 2.

The tubular member 61 is a cylindrical metal member that is centered around the axial center A. The tubular member 61 includes the first end 11 and the second end 12, which are both axial ends. The first end 11 of the tubular member 61 is provided with the projecting section 62, which projects outward in the axis-perpendicular direction from the outer peripheral surface 13.

The protruding section 65 is molded integrally with the mass body 20. The protruding section 65 protrudes from both axial ends of the inner peripheral surface 21 of the mass body 20 toward the outer peripheral surface 13 of the tubular member 61. The protruding section 65 is annular in shape and formed continuously in the circumferential direction. The inner peripheral surface of the protruding section 65 includes a leading end surface 66 and a sloped surface 67.

The leading end surface 66 forms the leading end of the protruding section 65 that is the farthest from the mass body 20. The leading end surface 66 opposes the outer peripheral surface 13 of the tubular member 61. The leading end surface 66 is formed in parallel with the axial center A (the outer peripheral surface 13 of the tubular member 61) in a cross-section including the axial center A. The sloped surface 67 is contiguous to the inner peripheral surface 21 of the mass body 20. The sloped surface 67 approaches the outer peripheral surface 13 of the tubular member 61 when sloped toward the leading end surface 66 from the axial center of the mass body 20.

In a cross-section of the dynamic damper 60 that includes the axial center A, the angle of the corner between the inner peripheral surface 21 of the mass body 20 and the protruding section 65 can be increased by the sloped surface 67 contiguous to the inner peripheral surface 21 of the mass body 20. Therefore, the adhesive for vulcanization bonding is unlikely to accumulate in the corner. This inhibits a bonding failure between the mass body 20, the protruding section 65, and the elastic coupling section 69 from being caused by the accumulation of the adhesive.

The method of manufacturing the mass body 20 and the protruding section 65 first forms a cylindrical member, for example, by casting. The cylindrical member has the same outside diameter as the mass body 20 and has a smaller inside diameter than the protruding section 65. The tubular member 61 and the protruding section 65 are formed by cutting the inner peripheral surface of the cylindrical member.

The method of manufacturing the tubular member 61 and the protruding section 65 is not limited to forming the tubular member 61 and the protruding section 65 by cutting a cast cylindrical member. The tubular member 61 and the protruding section 65 can alternatively be manufactured without cutting by producing a casting that is formed of the protruding section 65 protruded in the axis-perpendicular direction from the inner peripheral surface 21 of the tubular member 61 through the use, for example, of a sand core.

When the tubular member 61 and the protruding section 65 are to be cast by using, for example, a sand core, the leading end surface 66 of the protruding section 65 can be smoothed by cutting to form a cutting mark on the leading end surface 66. The spring constant of the elastic coupling section 69 is largely dependent on the axis-perpendicular dimension between the leading end surface 66 and the outer peripheral surface 13 of the tubular member 61. Therefore, the variations in the natural frequency of the dynamic damper 60 can be sufficiently suppressed by cutting and smoothing out only the leading end surface 66 and without cutting the inner peripheral surface 21 of the mass body 20. Consequently, the amount of cutting for suppressing the variations in the natural frequency of the dynamic damper 60 is reduced by forming the protruding section 65.

The elastic coupling section 69 is a member formed of a rubber elastic body. The elastic coupling section 69 is disposed between the inner peripheral surface 21 of the mass body 20 and the outer peripheral surface 13 of the tubular member 61. The elastic coupling section 69 is vulcanization-bonded to the inner peripheral surface 21 of the mass body 20, the protruding section 65, and the outer peripheral surface 13 of the tubular member 61.

The outer peripheral surface and opposite axial end faces of the mass body 20 are covered with the elastic film 43, which is molded integrally with the elastic coupling section 69. The axial dimension of the mass body 20 covered with the elastic film 43 is set to be smaller than the axial dimension between the second end 12 of the tubular member 61 and the projecting section 62. The elastic film 43 is then inhibited from coming into contact with the target member 2 and the projecting section 62 when, for instance, the mass body 20 vibrates in the axis-perpendicular direction with respect to the tubular member 61 attached to the target member 2. This inhibits the vibration of the mass body 20 from being obstructed by the above-mentioned contact.

The fastening member 70 includes a bolt 71 and a nut 55. The bolt 71 has a head 52 and a shank 54. The shank 54 of the bolt 71 is inserted into the tubular member 61 from a side toward the first end 11, and further inserted the through-hole 2a in the target member 2. In the resultant state, the nut 55 is attached to the shank 54. The tubular member 61 is then axially sandwiched between the target member 2 and the head 52. This causes the fastening member 70 to fasten the tubular member 61 to the target member 2.

Figure 5A:
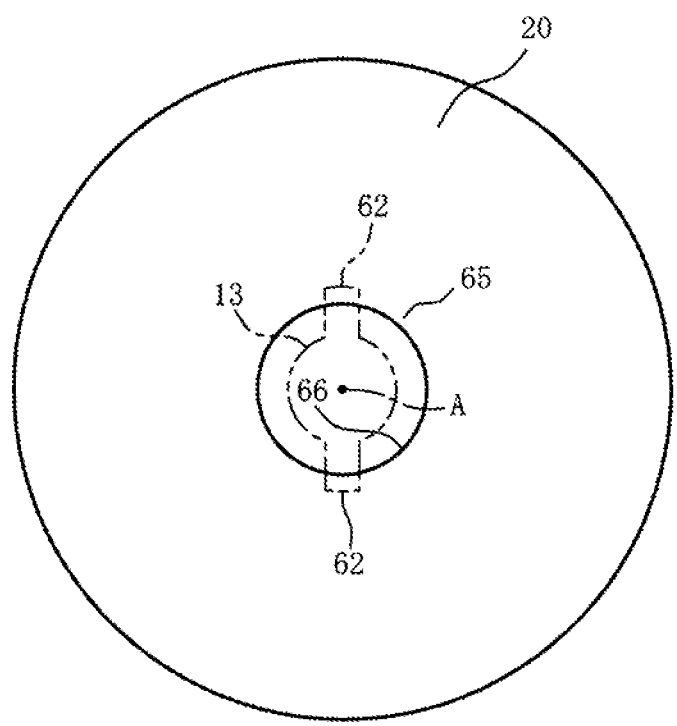
FIG. 5A is a side view illustrating the mass body and the protruding section.

As illustrated in FIGS. 4 and 5A, the projecting section 62, which projects outward in the axis-perpendicular direction from the outer peripheral surface 13 of the tubular member 61, is formed on a circumferential part of the tubular member 61. Two pieces of the projecting section 62 are disposed symmetrically with respect to the axial center A, and the distance between the leading ends of the two pieces of the projecting section 62, which are positioned outermost in the axis-perpendicular direction, is set to be greater than the inside diameter of the protruding section 65, which is annular in shape and formed continuously in the circumferential direction. The projecting section 62 and the protruding section 65 then overlap in the axial direction at any position reached by relatively rotating the mass body 20 and the protruding section 65 around the axial center A with respect to the tubular member 61. This reduces the weight of the projecting section 62 and prevents the mass body 20 from falling off from the tubular member 61 due, for instance, to fracture of the elastic coupling section 69.

As described above, the dynamic damper 60 according to the second embodiment is configured so that the protruding section 65 protrudes from the inner peripheral surface 21 of the mass body 20. Therefore, the spring constant of the elastic coupling section 69 is largely dependent on the axis-perpendicular dimension between the leading end surface 66 of the protruding section 65 and the outer peripheral surface 13 of the tubular member 61. The spring constant of the elastic coupling section 69 is more easily adjustable by adjusting the amount of protrusion of the protruding section 65 than by adjusting the inside diameter of the mass body 20 and the outside diameter of the tubular member 61. Consequently, the protruding section 65, which axially overlaps with the projecting section 62 in order to prevent the fall-off of the mass body 20, makes it easy to adjust the natural frequency of the dynamic damper 60.

As the protruding section 65 and the projecting section 62 overlap in the axial direction in order to prevent the fall-off the mass body 20, the inside diameter of the mass body 20 can be set irrespective of the outside diameter of the projecting section 62. This increases the degree of freedom in designing the inside diameter of the mass body 20, and thus increases the degree of freedom in designing the axis-perpendicular dimension between the inner peripheral surface 21 of the mass body 20 and the outer peripheral surface 13 of the tubular member 61. This makes it easy to adjust the natural frequency of the dynamic damper 60, which is dependent on the axis-perpendicular dimension.

Two pieces of the protruding section 65 protrude from the axial ends of the inner peripheral surface 21 of the mass body 20. Therefore, the spring constant of the elastic coupling section 69 at the axial ends, which is between the protruding section 65 and the tubular member 61, is greater than the spring constant therebetween. Consequently, the mass body 20 is unlikely to vibrate in the prying direction with respect to the tubular member 61.

A third embodiment of the present invention will now be described with reference to FIG. 5B. The second embodiment has been described on the assumption that the protruding section 65 is annular in shape and formed continuously in the circumferential direction. Meanwhile, the third embodiment will be described on the assumption that a protruding section 81 is formed intermittently in the circumferential direction. Elements identical with those described in conjunction with the first or second embodiment are designated by the same reference signs as their counterparts and will not be redundantly described.

Figure 5B:
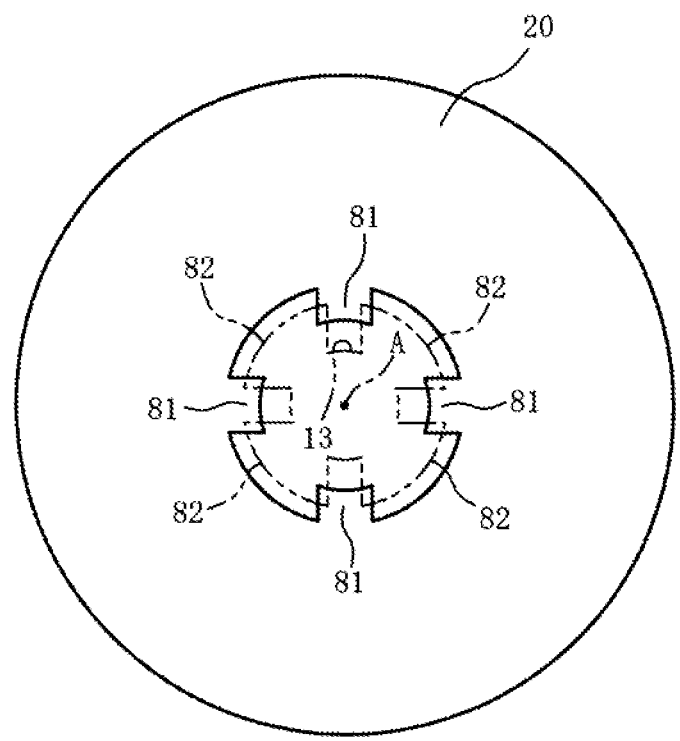
FIG. 5B is a side view illustrating the mass body and protruding section according to a third embodiment of the present invention.

FIG. 5B is a side view illustrating the mass body 20 and the protruding section 81 according to the third embodiment. In FIG. 5B, the outline of a projecting section 82 and the outline of the outer peripheral surface 13 of the tubular member 61 (see FIG. 4) are indicated by a two-dot chain line. The dynamic damper according to the third embodiment differs from the dynamic damper 60 according to the second embodiment in the shapes of the protruding section 65 and the projecting section 62.

As illustrated in FIG. 5B, a plurality of pieces of the protruding section 81 of the dynamic damper according to the third embodiment are intermittently disposed in the circumferential direction. A plurality of pieces of the projecting section 82 according to the third embodiment are also intermittently disposed in the circumferential direction. The spacing interval between neighboring pieces of the projecting section 82 are set to be smaller than the circumferential dimension of one piece of the protruding section 81. Therefore, a part of the projecting section 82 and a part of the protruding section 81 overlap in the axial direction at any position reached by relatively rotating the mass body 20 and the protruding section 81 around the axial center A with respect to the tubular member 61 (see FIG. 4). This prevents the mass body 20 from falling off from the tubular member 61 due, for instance, to fracture of the elastic coupling section 69 (see FIG. 4).

While the present invention has been described in terms of embodiments, persons of skill in the art will easily appreciate that the present invention is not limited to the foregoing embodiments, and that modifications and variations can be made without departing from the spirit and scope of the present invention. For example, the shapes of various elements, such as the tubular member 10, 61, the mass body 20, the protruding section 30, 35, 65, 81, the elastic coupling section 40, 69, and the fastening member 50, 70, are merely illustrative and not restrictive. It is obvious that various shapes may be adopted.

The first embodiment has been described on the assumption that a part of the flange 53 for the flange bolt 51 axially overlaps with a part of the protruding section 30. The second and third embodiments have been described on the assumption that a part of the projecting section 62, 82 of the tubular member 61 axially overlaps with a part of the protruding section 65, 81. However, the present invention is not limited to such configurations. An alternative is to place a washer between the first end 11 of the tubular member 10 without the projecting section 62, 82 and the head 52 of the bolt 71 without the flange 53, and allow a part (projecting section) of the washer to axially overlap with a part of the protruding section 30, 65, 81. Even in the above case, it is possible to prevent the mass body 20 from falling off from the tubular member 10, 61 due, for instance, to fracture of the elastic coupling section 40, 69. Another alternative is to allow the outside diameter of the head 52 of the bolt 71 without the flange 53 to be larger than the inside diameter of the protruding section 30, 65, 81 and cause a part (projecting section) of the head 52 to axially overlap with a part of the protruding section 30, 65, 81. Even in the above case, it is also possible to prevent the mass body 20 from falling off from the tubular member 10, 61 due, for instance, to fracture of the elastic coupling section 40, 69.

The first embodiment has been described on the assumption that the mass body 20 and the protruding section 30 are formed by casting, and that the leading end surface 31 of the protruding section 30 is formed by cutting. However, the present invention is not limited to such formation. Alternatively, the mass body 20, the protruding section 30, and its leading end 31 may be formed by cutting the inner peripheral surface of a cylindrical member that has the same outside diameter as the mass body 20 and a smaller inside diameter than the protruding section 30. Another alternative is to form the mass body 20 and the protruding section 30 by forging.

All the foregoing embodiments have been described on the assumption that the leading end surface 31, 66 of the protruding section 30, 35, 65, 81 is parallel to the axial center A. However, the present invention is not limited to such a configuration. Obviously, the leading end surface of the protruding section may be sloped with respect to the axial center A in order to obtain a desired spring constant of the elastic coupling section 40, 69. Further, the leading end of the protruding section need not always be planar. The leading end of the protruding section may be shaped like a point or a line.

The invention claimed is:

1. A dynamic damper, comprising:
   a tubular member that has a first end and a second end, the first and second ends being both axial ends;
   a mass body that is tubular in shape and has an inner peripheral surface, the inner peripheral surface being disposed at a predetermined distance from an outer peripheral surface of the tubular member;
   a protruding section that protrudes from the inner peripheral surface of the mass body, has a leading end opposing the outer peripheral surface of the tubular member, and is molded integrally with the mass body;
   an elastic coupling section that is formed of a rubber elastic body, the rubber elastic body being adapted to couple the inner peripheral surface of the mass body and the protruding section to the outer peripheral surface of the tubular member;
   a fastening member that is inserted into the tubular member in order to fasten the second end of the tubular member to a target member; and
   a projecting section that is disposed at the first end and projects outward in an axis-perpendicular direction of the tubular member;
   wherein the protruding section is positioned toward the second end with respect to the projecting section;
   wherein a part of the projecting section and a part of the protruding section overlap in an axial direction of the tubular member at any position reached by relatively rotating the mass body around an axial center of the tubular member with respect to the tubular member;
   wherein the elastic coupling section couples the leading end of the protruding section to a portion of the outer peripheral surface of the tubular member which opposes the leading end of the protruding section; and
   wherein the outer peripheral surface and both axial ends of the mass body are covered with an elastic film that is molded integrally with the elastic coupling section, and the elastic film is free from contact with the target member and the projecting section.

2. The dynamic damper according to claim 1, wherein the elastic coupling section is vulcanization-bonded to the mass body and to the protruding section; and
   wherein the protruding section has a sloped surface that is contiguous to the inner peripheral surface of the mass body and approaches the outer peripheral surface of the tubular member sloping toward the leading end from an axial outside.

3. The dynamic damper according to claim 1, wherein the mass body is a casting; and
   wherein a cutting mark is formed on the leading end.

4. The dynamic damper according to claim 1, wherein the protruding section is formed contiguously in the circumferential direction of the mass body.

5. The dynamic damper according to claim 4, wherein the projecting section is formed on a circumferential part of the tubular member.

6. The dynamic damper according to claim 1, wherein the protruding section is formed on a circumferential part of the mass body.

7. The dynamic damper according to claim 1, wherein the protruding section protrudes laterally from the inner peripheral surface of the mass body at a center position of the mass body in the axial direction of the tubular member.

8. The dynamic damper according to claim 1, wherein the protruding section protrudes from both axial ends of the mass body.

9. The dynamic damper according to claim 1, wherein the leading end of the protruding section and the outer peripheral surface of the tubular member are formed in parallel with the axial center.

10. The dynamic damper according to claim 1, wherein the projecting section is separated from contact with said elastic coupling section to avoid inhibition of vibration.

11. The dynamic damper according to claim 1, wherein an axial dimension of the mass body and the elastic coupling section combined is smaller than an axial dimension between the second end of the tubular member and the projecting section, such that the mass body and the elastic coupling section are inhibited from coming into contact with the projecting section when the mass body vibrates.

12. The dynamic damper according to claim 2, wherein in a cross-section containing the axial center, a corner is formed between the inner peripheral surface of the mass body, which extends substantially parallel to the axial center, and the sloped surface, which slopes with respect to the axial center.

13. The dynamic damper according to claim 1, wherein the elastic coupling section is coupled to the entire leading end of the protruding section and extends to and is coupled to the outer peripheral surface of the tubular member.

14. A dynamic damper, comprising:
a tubular member that has a first end and a second end, the first and second ends being both axial ends;
a mass body that is tubular in shape and has an inner peripheral surface, the inner peripheral surface being disposed at a predetermined distance from an outer peripheral surface of the tubular member;
a protruding section that protrudes from the inner peripheral surface of the mass body, has a leading end opposing the outer peripheral surface of the tubular member, and is molded integrally with the mass body;
an elastic coupling section that is formed of a rubber elastic body, the rubber elastic body being adapted to couple the inner peripheral surface of the mass body and the protruding section to the outer peripheral surface of the tubular member;
a fastening member that is inserted into the tubular member in order to fasten the second end of the tubular member to a target member; and
a projecting section that is disposed at the first end and projects outward in an axis-perpendicular direction of the tubular member;
wherein the protruding section is positioned toward the second end with respect to the projecting section;
wherein a part of the projecting section and a part of the protruding section overlap in an axial direction of the tubular member at any position reached by relatively rotating the mass body around an axial center of the tubular member with respect to the tubular member;
wherein the elastic coupling section couples the leading end of the protruding section to a portion of the outer peripheral surface of the tubular member which opposes the leading end of the protruding section;
wherein the protruding section protrudes laterally from the inner peripheral surface of the mass body at a center position of the mass body in the axial direction of the tubular member; and
wherein the elastic coupling section is coupled with the inner peripheral surface of the mass body at both ends of the protruding section along an axial direction, and the elastic coupling section includes a pair of concaved portions (41, 42) that are concave from axial ends toward the protruding section.

* * * * *